H. Fairbanks,
Grain Meter.

No. 110,965. Patented Jan. 17, 1871.

Witnesses.
Thaddeus Fairbanks
H. N. Fairbanks.

Inventor.
Henry Fairbanks

UNITED STATES PATENT OFFICE.

HENRY FAIRBANKS, OF ST. JOHNSBURY, VERMONT.

IMPROVEMENT IN AUTOMATIC WEIGHING AND DISTRIBUTING SCALES.

Specification forming part of Letters Patent No. 110,965, dated January 17, 1871.

*To all whom it may concern:*

Be it known that I, HENRY FAIRBANKS, of St. Johnsbury, in the county of Caledonia and State of Vermont, have invented certain Improvements in Weighing-Machines; and I do hereby declare that the following is a full and exact description thereof.

I denominate my improved weigher a "distributing-scale."

My invention consists in combining with a weighing-scale of one or more levers certain devices which will render its action largely automatic, and greatly facilitate its use wherever it is desirable to weigh and distribute equal quantities of liquids, grain, or any material that will flow—as, for example, in weighing liquids into cans and grain into bags. In the form shown it is particularly designed to facilitate the filling of cans each with a determinate weight of petroleum for shipment, the scale doing so much of the work automatically that the attendant has only to remove each can when filled and replace it by one that is empty.

The accompanying drawings form a part of this specification.

Figure 6:
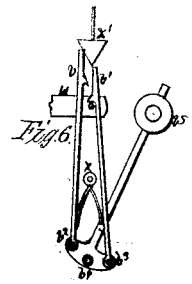
Figure 1:
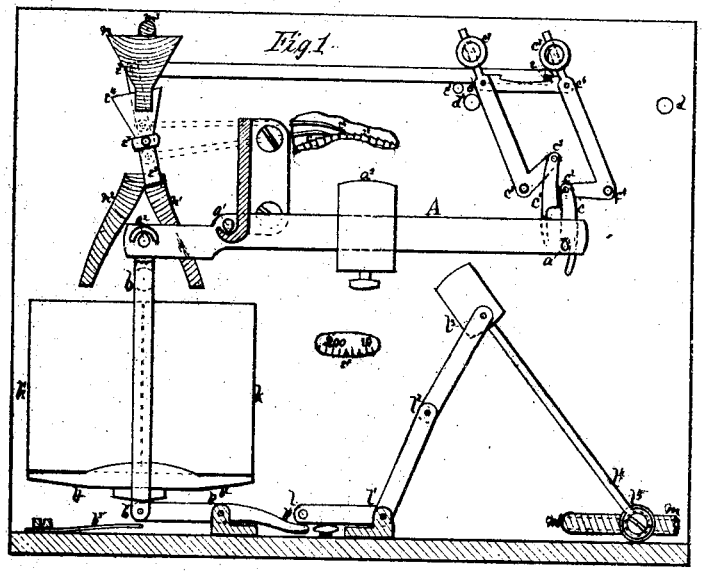
Figure 2:
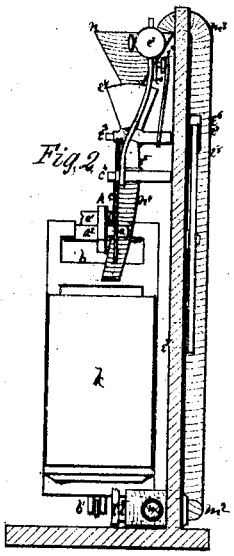
Figure 4:
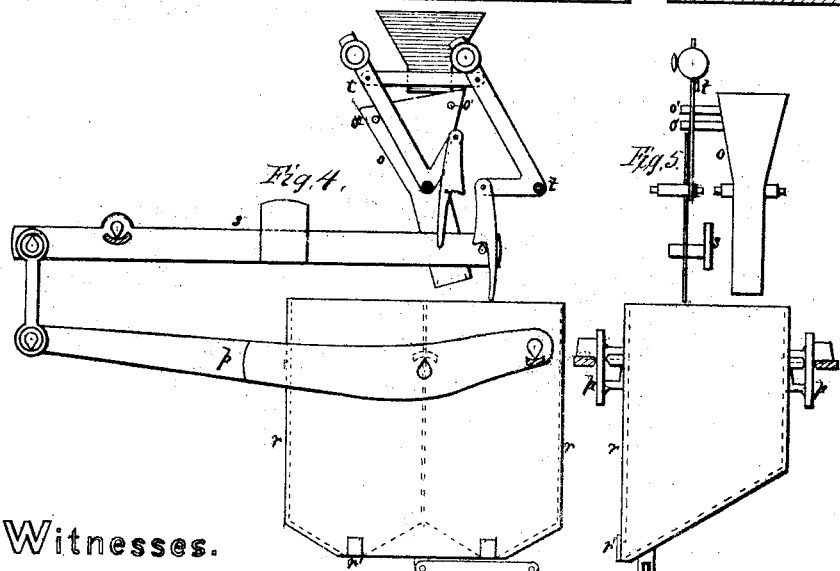
Figure 5:
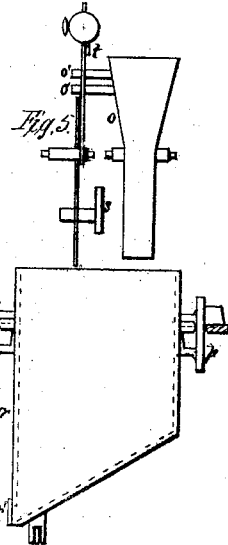

Figure 1 is a front view of a machine embodying my invention; Fig. 2, an end view, and Fig. 3 a plan view. Fig. 4 is a front view of a machine with two levers, showing the arrangement that would be required in a grain-scale. Fig. 5 is a corresponding end view. Fig. 6 shows a modification of the shifting device, which might be available in case it is for any reason desirable that this mechanism should be set below the level of the scale-beam.

Figure 3:
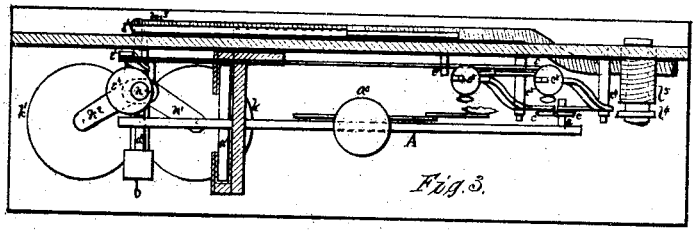

It will be only necessary to give a particular description of the form shown in the model and in Figs. 1, 2, and 3—the machine for weighing kerosene.

A is the scale-beam, furnished with the adjustable weighing-poise $a^3$, and, if desirable, with counterpoise-weights suspended, in the usual manner, near the end of the scale-beam. It is suspended upon a fulcrum knife-edge at $a'$.

At $a^2$ is the knife-edge of the load, from which is suspended the little platform $b^2$ $b^2$. This platform, carried by the suspending-frame $b$ $b'$, is adapted to receive and guide to their places the cans $k$ $k'$. It is prevented from swinging in one direction by the length of the supporting-pivot $a^2$, and in the other by the hinged level-bar $b'$ $b^2$. Over the orifices by which these cans $k$ $k'$ are to be filled as they stand upon the platform are the ends of two curved spouts, $n'$ $n^2$, which are united at their upper ends, and by their curvature separated below. Just above the partition which at their upper end separates these two channels $n'$ $n^2$ moves the end $e^5$ of a swinging tunnel, $e^4$, carried by an arbor, $e^3$, which has just sufficient motion to direct the stream of whatever flows from the fixed tunnel $n$ above into either one or other of the curved spouts $n'$ $n^2$, and thereby into one or other of the cans upon the platform. The swinging tunnel $e^4$ is slightly overbalanced, so that whichever way it is rocked it remains in the extreme position on that side, without liability of being accidentally displaced. It is shifted from one side to the other by means of an arm, $c^2 e^3$, rising from the arbor $e^3$, which is hinged at $e^2$ to a connecting-rod, $e$ $e^2$, that rod being supported by a guide, $e'$, and receiving motion communicated to its projecting pin $e$. The parts lettered $c$ $c'$, &c., to $c^9$ are the mechanism for communicating this shifting motion, while at the same time they furnish a certain definite resistance to the rising scale-beam, and act upon it as a counterweight.

There are two parallel arbors, $c^3$ $c^4$, carrying each two arms standing at an acute angle with each other, and together forming an elbow-shaped piece with the arbor at the angle. These elbow-shaped pieces are lettered $c^2$ $c^4$ $c^6$ and $c^3$ $c^5$ $c^7$. At their upper ends they carry adjustable weights $c^8$ $c^9$. At $c^6$ $c^7$ these elbow-shaped pieces are hinged to a connecting-bar, so that as they move from side to side their upper arms shall in every position be parallel to each other. This connecting-bar is formed with two shoulders on its upper side suited to engage the pin $e$, and so to communicate motion to the shifting-tunnel. This pin $e$ is, however, so supported upon its connecting-rod resting on $e'$ as not to be touched by the bar $c^6$ $c^7$ until that has moved a little way, rising in the arc of its motion. The other arm of each elbow-shaped piece is in one position horizontal, in the other elevated. From these two alternately horizontal arms $c^2$ $c^4$ and $c^3$ $c^5$ are loosely hinged at the extremities remote from the arbors little swinging pieces $c$ $c'$, each having a notch or shoulder on the side that is turned toward the other. When either arm is horizontal, it carries the pin $c^2$ or $c^3$, upon which the swinging piece is hinged, into position directly over the knife-edge $a$, carried by the scale-beam A near its extremity. It will be understood that $c^2$ $c^3$ replace each other in this position, each descending to it as the other rises from it, and that the whole shifting mechanism is so overbalanced that it can rest only in one extreme or the other of its oscillation—that is, with either $c^2$ or $c^3$ vertically over the knife-edge $a$ when the scale-beam is level. In the lowest position of the scale-beam the swinging piece $c$ or $c'$ hanging from the arm that for the time is horizontal swings its shoulder over the knife-edge in position to be engaged by it when the beam rises. The level of this shoulder is such that the knife-edge comes to its bearing just as the scale-beam, rising with the increasing load, becomes level, and so is in position for weighing. The stops $d$ $d'$ are adjustable, so that the lifting force which must be exerted through the knife-edge to shift the mechanism in either direction is accurately constant. The resistance is greatest at the start, and rapidly diminishes, so that, practically, weight is ascertained while the scale-beam is still level, and there is no error introduced by the movement of the knife-edge $a$ in arc about the supporting-fulcrum. Friction is made as little as possible by accurate workmanship, and, being almost perfectly constant, does, practically, no harm. The rising scale-beam, at the moment when the can that is filling has received the desired weight, throws over the shifting device, and this in the latter part of its movement, mainly by its acquired momentum, shifts the swinging tunnel and directs the stream into the empty can. The attendant removes the filled can and replaces it by one that is empty. The platform being thus lightened, the scale-beam sinks, the knife-edge $a$ catches under the shoulder of the other swinging piece then lowest, and the machine is in position for shifting in the opposite direction. Whenever the scale-beam is rising with one of the swinging pieces riding upon the knife-edge $a$, that swinging piece, as it rises, fends off the other one, then descending, so that there is no possibility of its catching upon the knife-edge. In this way I have provided that the stream shall be shifted when there are upon the platform two cans, one empty and the other properly filled, and therefore that any number of cans of equal weight shall be filled with equal weights of the liquid.

It is true that after the scale-beam begins to rise the stream still runs a moment before the shifting is complete. To meet this source of error, I set the adjustable poise for a little less weight than I wish in the cans, so that it shall move in season to shift the stream at the right moment. In use, the entering stream is generally constant, and this provision suffices. This is the weighing-machine. I combine with it a counting mechanism or register of the number of loads by attaching to the arbor $e^3$ of the shifting-tunnel two short arms, extending up and down, to which are hinged pawls $e^6$ $e^7$, acting on the ratchet-wheel $e^8$, which serves as a register. This may be connected with reduced motion to other wheels and the capacity of the register be increased. I have also combined with the weighing-machine a safety stop-cock or gate, intended, in case the attendant should fail to remove the filled can, to close automatically and cut off the stream before the second can upon the platform is entirely full and in danger of overflowing. The liquid flows to the tunnel $n$ through a supply-pipe, $m$ $m'$ $m^2$ $m^3$, which on the way passes through the stop-cock $l^5$. The handle of this stop-cock is drawn down by a weight or spring, and by its fall the stop-cock is closed. The handle is supported by the hinged pieces $l$ $l'$ $l^2$ and $l^2$ $l^3$, forming a knee-joint at $l^2$. When this joint is on the left of a line joining $l'$ and $l^3$, the weight is supported; when on the right, it falls by the bending of the knee-joint. The horizontal branch $l$ $l'$ rests upon a screw, by moving which the whole device is made more or less stable. This horizontal arm carries at $l$ a pin, which stands out over $b^4$—the extension of the level bar or check-rod $b'$ $b^3$. When this pin is lifted by $b^4$ rising, the stop-cock closes. In ordinary use the scale-beam moves far enough to shift the mechanism $c$ $c'$, &c., and the further descent of the platform is arrested by a stiff spring, $b^5$. When, however, the platform is overloaded by both cans being allowed to fill, the tension of this spring is overcome, the platform descends lower, and the bar $b'$ $b^3$ $b^4$ is moved so far that it strikes the pin $l$ and releases the handle of the stop-cock, so that the supply-stream of the liquid is arrested. The same mechanism could be connected so as to close a valve in a grain-spout. I have proposed, instead of this arrangement, to support the bearing in which the fulcrum knife-edge of the scale-beam rests by a stiff spring which shall hold it firmly against a guide-stop in ordinary use, but yield a little when the platform is overloaded, and then to use this slight yielding motion to release a weight and close a stop-cock.

The grain-scale shown in Figs. 4 and 5 consists of a forked lever, $p$, between the forks of which hangs the divided hopper $r$ $r$ and the scale-beam $s$, with the automatic shifting device $t$ $t$, like the one already described, acting in this case upon the shifting-spout $o$ by means of the two pins $o'$ $o'$. The scale shifts when one hopper is empty and the other filled by the required weight of grain. The operator then opens one of the valves $r'$ $r'$ and quickly empties the filled division of the hopper into a bag, which is properly supported below. The scale-beam descends and is prepared to weigh the next load, which flows in while the operator removes the filled bag. The hopper may be divided in the other direction, if desired, and two spouts be placed below the shifting-spout to direct the stream into the divisions.

Should it be necessary, for any purpose, to use a shifting apparatus below the level of the scale-beam, that shown in Fig. 6 might be substituted, where $u$ is the scale-beam, $v\ v'$ the pieces with shoulders catching on the knife-edge, and $v^4\ v^5$ a weighted arm, of which the position is reversed each time the scale-beam rises. The piece $v$ or $v'$ which for the time is highest is kept from swinging against the other, either by resting against the V-shaped piece $x'$, which is carried by a light spring above, or otherwise by one of the light springs attached at $x$. As the lower end, $v^2$, of the piece $v\ v^2$ is carried over toward the same vertical line with the axis $v^4$, the upper end, $v$, is thrown from it and back from the knife-edge; so, too, the piece $v'\ v^3$.

The machine embodying my invention may be variously modified while retaining the features that I think new and valuable. I am acquainted with many weighing-machines in which some change, as of the valves of a grain-hopper, is effected by the rise of a scale-beam and the reverse by its fall. My machine is quite unlike these. I am also acquainted with machines of the class patented to R. S. Morrison in 1866, and to me July 13, 1869, in which the rising scale-beam changes the entering stream of grain alternately from one division to the other of a divided hopper. I think the machine herein described is unlike those machines in every feature patented in them, and for many uses superior to them.

What I claim, and desire to secure by Letters Patent, is as follows:

1. The combination of two reversed bent levers, $c^2\ c^3$, and their connection with a connecting link and pendants $c\ c'$, and with the scale-beam A and operating mechanism for distributing or controlling the reception of material, as specified.

2. The combination of a weighing-scale with the shifting device $c\ c'$, &c., to $c^3$, as set forth.

3. In combination with a distributing-scale, a device for automatically closing a valve or stop-cock, and thereby cutting off the supply-stream, when, in consequence of any derangement, the scale is overloading, as herein described.

In testimony whereof I have hereunto set my name in presence of two subscribing witnesses.

HENRY FAIRBANKS.

Witnesses:
THADDEUS FAIRBANKS,
A. N. FAIRBANKS.